United States Patent [19]

Bourdalé

[11] 3,741,892
[45] June 26, 1973

[54] DEVICE FOR FILTERING A PARTICLE-LADEN FLUID

[76] Inventor: Lucien R. Bourdalé, 30 Avenue Aristide Briand, Arpajon, France

[22] Filed: Nov. 22, 1971

[21] Appl. No.: 200,845

[30] Foreign Application Priority Data
Nov. 23, 1970 France .................................. 7041907

[52] U.S. Cl. ................... 210/65, 55/324, 55/484, 210/323, 210/346, 210/433
[51] Int. Cl. ............................................. B01d 29/24
[58] Field of Search ..................... 55/324, 341, 484, 55/65; 210/323, 346, 409, 433

[56] References Cited
UNITED STATES PATENTS
2,988,223  6/1961  Janson ................................ 210/346
3,421,295  1/1969  Swift et al. ............................. 55/484

Primary Examiner—Samih N. Zaharna
Assistant Examiner—Ivars Cintins
Attorney—Woodhams, Blanchard and Flynn

[57] ABSTRACT

A method of filtering a liquid or gaseous particle-laden fluid, in which method upstream and downstream paths of travel are imparted to the fluid on either side of a filtering surface through which at least part of the fluid is thus caused to pass, said surface being located between an inlet for the laden fluid and an outlet for the purified fluid. The invention also relates to a device for performing this method.

2 Claims, 3 Drawing Figures

DEVICE FOR FILTERING A PARTICLE-LADEN FLUID

Except when expensive means are used, the filtering methods generally employed at present do not enable a fluid to be separated from the particles suspended therein on a continuous basis and with a virtually constant loss of pressure. In the majority of apparatuses used, it is in fact necessary to interrupt the operation periodically in order to clean the filtering surfaces which would otherwise finally prevent any passage of fluid as a result of the accumulation of particles on said surfaces.

The main aim of the present invention is to overcome this drawback, and to do this, one of its objects is to provide a filtering method of the above-mentioned kind, which is mainly characterized in that it consists in simultaneously creating two vacua, one on each side of the filtering surface, the first vacuum causing flow of the purified fluid, and the second withdrawing part of the fluid during its upstream travel for the purpose of carrying the particles towards an outlet for the particles, the upstream path of travel of the fluid being substantially parallel with the filtering surface, whereas the flow of fluid into this path of travel decreases constantly from the inlet for the laden fluid to the outlet for the particles so that the mean velocity is substantially constant and sufficient constant and entrain all the particles of which the path of travel is always in the same direction as the upstream path of travel of the fluid.

As the result of this arrangement, the particles are automatically progressively removed, and this method consequently enables filtering to be carried out on a continuous basis with a virtually constant loss of pressure.

A device for performing the method of the invention is characterized in that it comprises a hollow body, to which are connected, at the top, an inlet port for the laden fluid, at the side, an outlet port for the purified fluid, and at the bottom, an outlet port for the particles, this hollow body having a cross-section which decreases constantly from the inlet for the laden fluid to the outlet for the particles, and being partitioned by a series of filtering elements arranged to form, alternately, on the one hand, passages of diminishing cross-section which directly connect the inlet for the laden fluid to the outlet for the particles, and on the other hand, passages forming the downstream evacuation zone for the purified fluid. It will thus be readily appreciated that it is possible to provide filters of very great capacity, while at the same time observing the conditions which are necessary to enable the system to function correctly.

Some embodiments of the invention will now be described by way of example and by reference to the attached drawing, in which.

Figure 1:
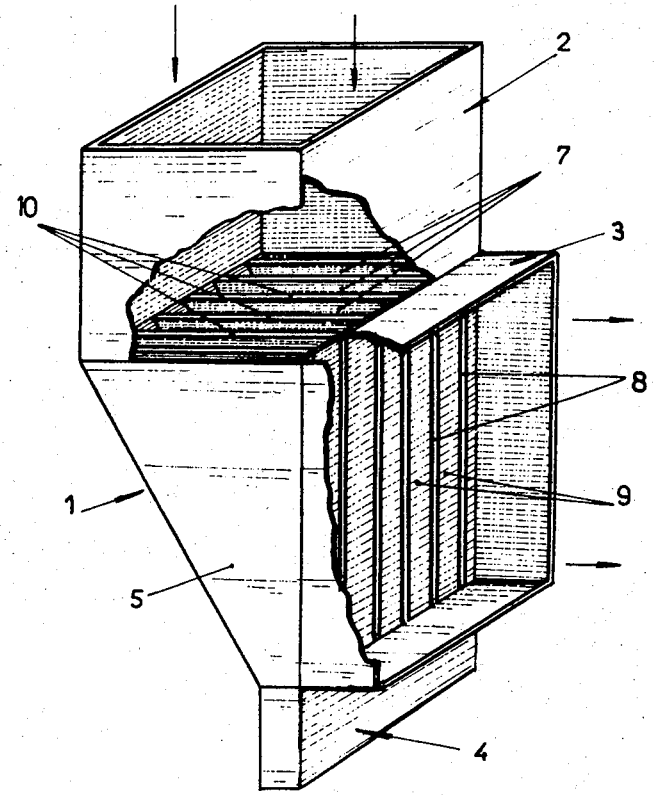
FIG. 1 is a simplified perspective view of a filter in accordance with the invention, wherein some portions have been removed.
Figure 2:
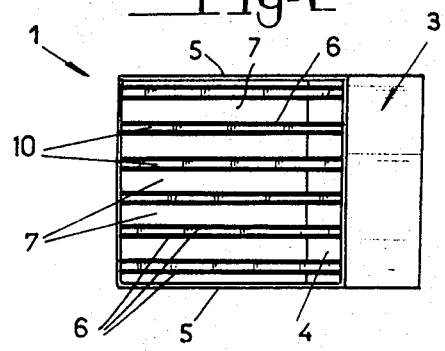
FIG. 2 is a plan view of this filter.

The filter illustrated in FIGS. 1 and 2 is mainly constituted by a hollow body 1 to which are connected, at the top, an inlet port 2 for the laden fluid, at the side an outlet port 3 for the purified fluid and at the bottom, an outlet port 4 for the particles. This hollow body has two opposite lateral faces 5 of trapezoidal form, and therefore has a cross-section which diminishes constantly from the port 2 to the port 4.

The interior of the body 1 of the filter is partitioned by a certain number of filtering plates 6 which are arranged vertically and are separated from each other by gaps 7 alternating with smaller gaps 8. These plates which are twelve in number in the example here described, are likewise of trapezoidal form and they are arranged parallel with the lateral faces 5 of the body of the filter. It will also be seen that the end plates are separated from these side faces 5 by a gap which is half the width of the gap 7, for a reason which will be explained hereinafter.

The unoccupied spaces 7 between the filtering plates 6 are blocked at the side presented to the outlet port 3 for the purified fluid by fluid-tight partitions 9, whereas the unoccupied spaces 8 are blocked by fluid-tight partitions 10 at the side presented to the inlet port 2 for the laden fluid. This arrangement defines an upstream zone, comprising the inlet port 2, the unoccupied spaces 7 and the outlet port 4, and a downstream zone, comprising the unoccupied spaces 8 and the outlet port 3. These upstream and downstream zones are separated by fluid-tight partitions 9 and 10 and by the filtering plates 6.

This filter is of course supplemented by the known apparatus and equipment generally employed for filtering purposes, i.e., blowers, compressors, pumps, valves, pressure gauges, flow meters etc., which, for the sake of clarity, have not been illustrated in the drawing.

The filter in accordance with the invention functions in the following manner.

The liquid or gaseous particle-laden fluid is admitted through the inlet port 2 and then passes into the unoccupied spaces 7 in the body 1 of the filter. The greater portion of the fluid passes through the filtering partitions 6, moves into the unoccupied spaces 8 and discharges into the outlet port 3 which is subjected to a first reduction in pressure in relation to the inlet port 2, and purified fluid thus results. The remaining portion of the fluid continues its travel through the unoccupied spaces 7, parallel with the filtering plates 6, and emerges through the port 4 which is subjected to a second reduction in pressure in relation to the inlet port 2.

As the cross-section of the body 1 of the filter decreases progressively and the gaps 7 are of equal width with the exception of the first and last, between the end plates and the side faces 5, which are half the width of the others, the flow of fluid in each of these unoccupied spaces 7 decreases progressively from the port 2 to the port 4. The mean velocity of the fluid is thus substantially constant, and the system is so designed that this velocity is great enough to carry almost all if not all of the particles, suspended in the fluid admitted through the port 2, towards the port 4.

Thus, the static filter of the invention enables a fluid and the particles suspended therein to be separated from each other on a continuous basis and with a virtually constant loss of pressure, practically all the particles, including the smallest normally falling within the particle-size range of the fluid treated, being removed efficiently.

It will in fact be seen that the particles follow a path of travel which is always in the same direction as the upstream path of travel of the fluid, so that the smallest particles are also entrained, despite their low inertia.

To achieve this, it is of course necessary for a certain number of conditions to be met. In particular the developed surface of the filtering partitions must be such that the frontal velocity of the fluid passing through them, that is to say the quotient of the amount of fluid purified by this surface, should be sufficiently low so that the frictional force of the particles on the filtering partition remains lower than the component of drag of the fluid on these particles. Furthermore, since the flow of fluid remaining upstream in the port 4 should be as low as possible, it is necessary for the cross-section of this port to be as small as possible and for the mean velocity of the fluid upstream to be slightly greater than that necessary to entrain the particles.

Additionally, preliminary separation may be rendered necessary prior to entry of the fluid into the filtering zone so as to remove excessively large particles which might block the spaces 7 between the filtering plates 6.

Finally, that portion of the fluid extracted upstream may be recycled to the inlet 2 of the filter, after total or partial separation of the particles; alternatively it may be discharged directly into the atmosphere.

When the new filter is put into service, its loss in pressure first increases at a diminishing rate, and at the end of a certain period it reaches a limit which constitutes the constant pressure-loss of the filter.

During this period of time, a permanent layer of particles known as a "cake" forms on the porous partitions of the filter, and this supplements the separating action of the partitions. At the same time the initial number of pores of the filtering partitions increases, and the cross-section of the pores become progressively smaller as a result of particles becoming trapped in the pores.

When the loss of pressure through the filter reaches its final constant value, the pores of the filtering partitions or of the cake will all have a cross-section lower than the size of the smallest particle within the normal particle-size range of the fluid under treatment. From this moment on the filter will act with virtually full efficiency upon all the particles within this normal range.

It would of course be possible to achieve this full efficiency immediately by using filtering partitions with pores of a cross-section less than the size of the smallest particle in the normal particle-size range of the fluid to be purified, but a cake would still form in the initial period of use of the filter. The possibility could also be envisaged of forming the cake beforehand using particles of suitable size, before putting the filter to industrial use.

If for some reason the loss of pressure of the filter accidentally becomes too great during the course of operation, the upstream flow of fluid could be advantageously increased temporarily in order to increase the velocity of the fluid in the upstream zone. The increase in velocity results in greater drag of the particles and consequently rapidly establishes normal conditions, i.e., brings the loss of pressure to its normal level. This temporary increase of flow may also be repeated as often as might be considered necessary.

Figure 3:
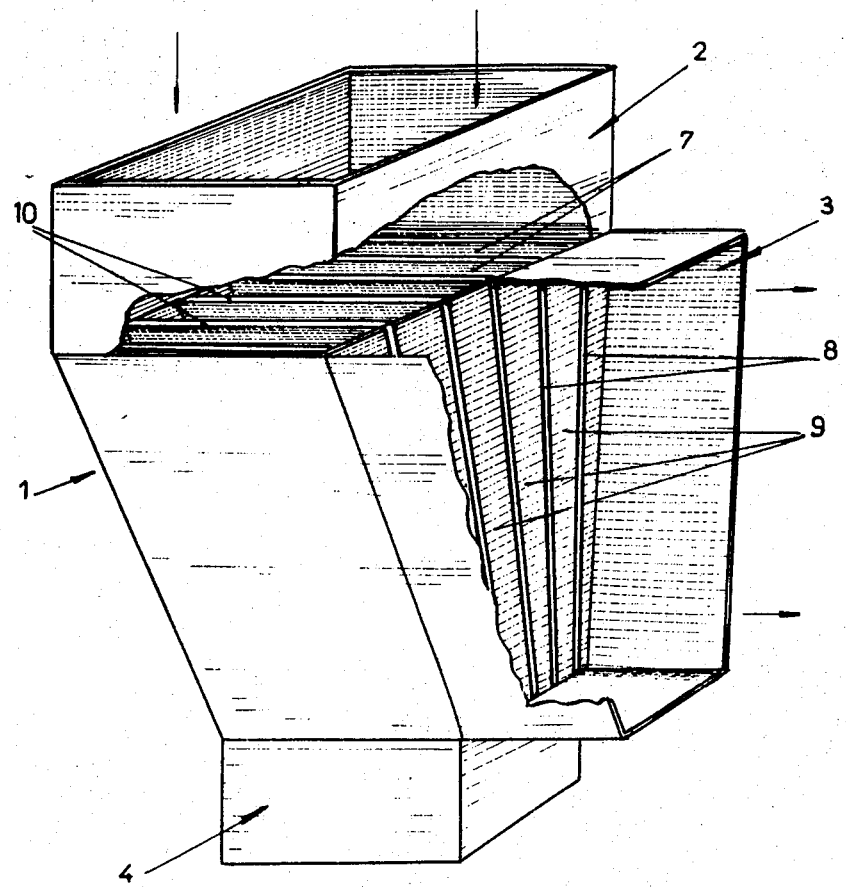
FIG. 3 is a perspective view of a modified form of filter in accordance with the invention, wherein some parts have been removed.

In the modified form illustrated in FIG. 3, the lateral outlet port 3 for the purified fluid is positioned on one of the lateral trapezoidal faces of the body 1 of the filter. The filtering plates 6 are here of rectangular form and they are arranged fanwise and perpendicular to these trapezoidal faces so that the gaps 7 decrease in width from the inlet 2 for the laden fluid to the outlet 4 for the particles. In this way the velocity of the fluid in its upward path of travel remains substantially constant and sufficient to entrain the particles in suspension in the fluid, admitted through the port 2, towards the outlet port 4, the purified portion of the liquid being collected by way of the port 3 as in the previously described embodiment.

This filter thus functions in exactly the same manner as the filter illustrated in FIGS. 1 and 2. It will however be noted that this modified form is particularly suitable in the manufacture of high-capacity filtering units. It would in face be possible to use several elements of the kind illustrated in FIG. 3, in a group, so as to obtain an assembly of cylindrical form capable of handling a large flow of fluid in a relatively small space.

I claim:

1. A method of filtering a particle-laden fluid on a continuous basis and with a substantially constant loss of pressure, in which method upstream and downstream paths of travel are imparted to the fluid on either side of a filtering surface through which part of the fluid is caused to pass, said surface being located between an inlet for the laden fluid and an outlet for the purified fluid, and in which two vacua are simultaneously created, one on each side of the filtering surface, the first vacuum causing flow of the purified fluid and the second withdrawing a portion of the fluid in its upstream path of travel so as to carry the particles towards an outlet for the particles, the upstream path of travel of the fluid being substantially parallel with the filtering surface, whereas the flow of the fluid along this path of travel is progressively reduced from the inlet for the laden fluid to the outlet for the particles, characterized in that it consists in keeping the mean velocity of the fluid substantially constant and sufficiently high for its frictional effect upon the filtering surfaces to limit the thickness of the layer of particles deposited thereon and consequently to maintain the loss of pressure of the fluid through the filtering surface substantially constant.

2. A device for performing the method claimed in claim 1, comprising a hollow body to which are connected, at the top, an inlet port for the laden fluid, at the side, an outlet port for the purified fluid and, at the bottom, an outlet port for the particles, characterized in that this hollow body has a cross-section which diminishes progressively from the inlet for the laden fluid to the outlet for the particles, and is partitioned by a series of filtering plates arranged to form, alternately, on the one hand, passages of diminishing cross-section which directly connect the inlet for the laden fluid to the outlet for the particles, and on the other hand, passages forming the downstream discharge zone for the purified fluid.

* * * * *